(12) United States Patent
Steinbeck et al.

(10) Patent No.: US 7,976,078 B2
(45) Date of Patent: Jul. 12, 2011

(54) DEVICE AND METHOD FOR THE DETACHABLE CONNECTION OF STRUCTURAL PARTS, IN PARTICULAR IN AN AIRCRAFT

(75) Inventors: Herbert Steinbeck, Hamburg (DE); Konstantin Wagner, Laupheim (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 12/380,065

(22) Filed: Feb. 23, 2009

(65) Prior Publication Data

US 2009/0223261 A1 Sep. 10, 2009

Related U.S. Application Data

(63) Continuation of application No. PCT/EP2007/006572, filed on Jul. 24, 2007.

(60) Provisional application No. 60/824,475, filed on Sep. 5, 2006.

(30) Foreign Application Priority Data

Aug. 23, 2006 (DE) .......................... 10 2006 039 474

(51) Int. Cl.
*E05C 3/02* (2006.01)
*E05C 5/02* (2006.01)

(52) U.S. Cl. ............ 292/194; 292/57; 292/63; 292/240; 292/DIG. 55

(58) Field of Classification Search .................... 292/57, 292/63, 65, 98, 109–111, 124, 240, 241, 292/DIG. 55; 403/DIG. 8; 52/127.9
See application file for complete search history.

(56) References Cited

U.S. PATENT DOCUMENTS

| 2,340,864 | A | | 2/1944 | Harold | |
|---|---|---|---|---|---|
| 2,486,686 | A | * | 11/1949 | Shreve | 292/111 |
| 2,647,287 | A | * | 8/1953 | Jones | 52/582.2 |
| 2,714,751 | A | * | 8/1955 | Stuart et al. | 52/582.2 |
| 2,738,211 | A | | 3/1956 | Schlueter | |
| 2,896,989 | A | | 7/1959 | Ehret | |
| 3,472,545 | A | * | 10/1969 | Berkowitz | 292/111 |
| 3,484,832 | A | * | 12/1969 | Langer | 292/111 |
| 3,563,469 | A | | 2/1971 | Stacey | |
| 3,661,410 | A | * | 5/1972 | Larson et al. | 52/127.9 |
| 3,784,240 | A | * | 1/1974 | Berkowitz | 292/111 |
| 3,851,922 | A | * | 12/1974 | McCoy | 292/111 |
| 4,417,430 | A | * | 11/1983 | Loikitz | 52/582.2 |
| 4,512,122 | A | * | 4/1985 | Berkowitz | 52/127.9 |
| 4,918,954 | A | | 4/1990 | Stickel et al. | |

(Continued)

FOREIGN PATENT DOCUMENTS

| BE | 337 175 | 11/1926 |
|---|---|---|
| BE | 562 189 | 6/1960 |
| DE | 101 38 471 | 8/2003 |

(Continued)

*Primary Examiner* — Carlos Lugo
(74) *Attorney, Agent, or Firm* — Krieg DeVault LLP

(57) ABSTRACT

A device (10) for the detachable connection of structural parts (80, 84) in an aircraft, comprising a clamping lever arrangement (12) associated with a first structural part (80) and a clamping pin (14) associated with a second structural part (84), wherein the clamping lever arrangement (12) comprises an eccentric shaft (20) rotatably mounted about a rotation axis (A) on the first structural part (80), a clamping lever (16) mounted eccentrically and swivellably with respect to the eccentric shaft (20) and a driving bushing (18) rotatably mounted relative to the eccentric shaft (20) about the rotation axis (A) and coupled in a geared manner to the clamping lever (16), wherein the clamping lever arrangement (12) can furthermore be displaced between a release position, a readiness position and a locking position.

18 Claims, 5 Drawing Sheets

U.S. PATENT DOCUMENTS

| | | | | |
|---|---|---|---|---|
| 5,452,925 | A | * | 9/1995 | Huang .......................... 292/57 |
| 6,070,919 | A | * | 6/2000 | Finkelstein .................. 292/111 |
| 6,626,017 | B2 | * | 9/2003 | Herbeck et al. ................. 70/63 |
| 2008/0073913 | A1 | * | 3/2008 | Gu ................................ 292/65 |

FOREIGN PATENT DOCUMENTS

| | | |
|---|---|---|
| FR | 333 202 | 6/1903 |
| JP | 05280241 A * | 10/1993 |
| WO | PCT/EP2007/006572 | 2/2008 |

\* cited by examiner

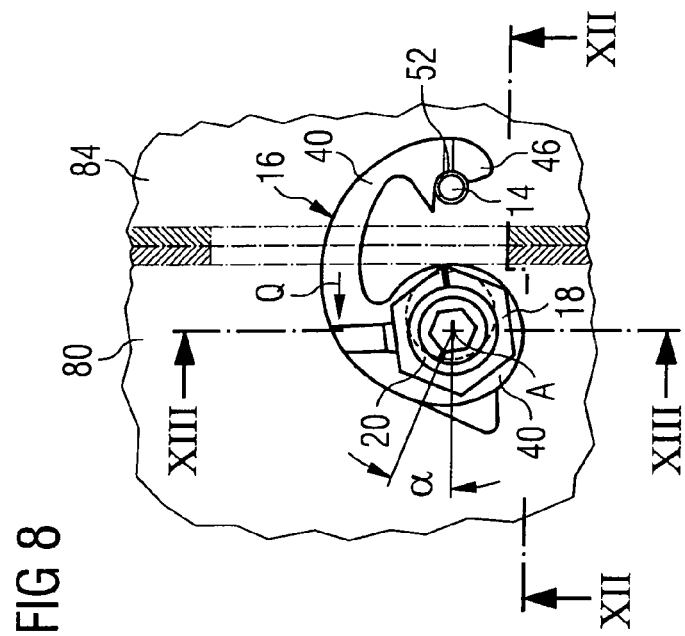
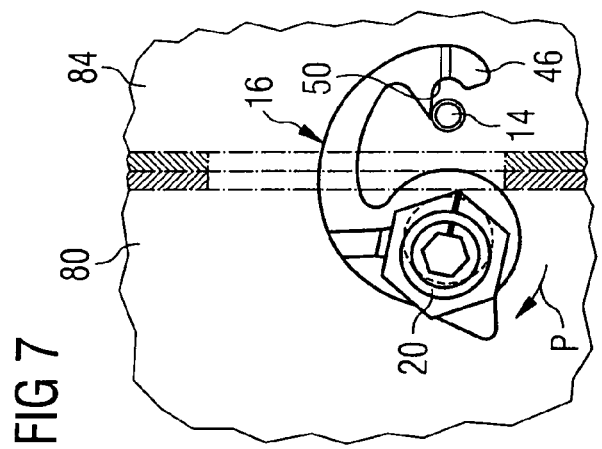
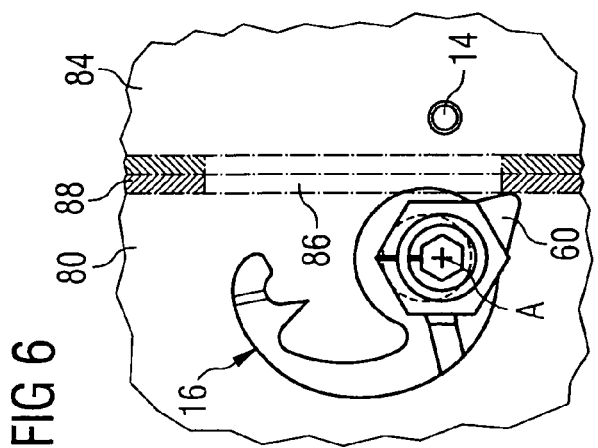

DEVICE AND METHOD FOR THE DETACHABLE CONNECTION OF STRUCTURAL PARTS, IN PARTICULAR IN AN AIRCRAFT

The present application is a continuation application of PCT/EP2007/006572 filed Jul. 24, 2007 which claims priority to German Patent Application No. 10 2006 039 474.7, filed Aug. 23, 2006 and claims the benefit of U.S. Provisional Patent Application No. 60/824,475, filed Sep. 5, 2006, each of which is incorporated herein by reference.

The present invention relates to a device and a method for the detachable connection of structural parts, in particular in an aircraft. In modern aircraft it is often necessary to install and dismantle individual structural elements quickly. For example, in passenger aircraft certain facilities are designated that can easily be removed from a stowed or inoperative state, so that they can be used temporarily. An example of such are rest stations for the flight crew, also termed flight crew rest compartments. In particular in long-haul flights such rest stations should be able to be removed easily from their stowed position, so that areas lying behind them are easily accessible for use by the flight crew. However, as soon as these rest stations are needed again, they have to be brought once more in a space-saving and above all mechanically safe manner into their stowed position, in which they are safely is retained and occupy as little space as possible.

Up to now loose parts such as bars, snap closures or the like have often been used to secure such installable and dismantlable structural elements. Although such hitherto used connection mechanisms were as a rule relatively simple to operate, they suffered from a large number of disadvantages. Thus, it has been found for example that bar-type solutions cannot withstand the constant vibrations and cannot guarantee a reliable permanent connection of the structural elements. Connection mechanisms involving loose parts moreover conceal the danger that the parts could be lost, with the result that the connection mechanism is no longer usable.

The prior art documents DE 101 38 471 A1, U.S. Pat. Nos. 3,565,469 and 2,738,211 show lock means used in the art for connecting structural parts.

The object of the present invention is accordingly to provide a device and a method for the detachable connection of structural parts in an aircraft, which by dispensing with loose parts guarantees a secure and permanent connection and is characterised by a high ergonomic efficiency.

This object is achieved by a device for the detachable connection of structural parts in an aircraft, which device comprises a clamping lever arrangement associated with a first structural part and a clamping pin (brace) associated with a second structural part, wherein the clamping lever arrangement comprises an eccentric shaft rotatably mounted about a rotation axis on the first structural part, a clamping lever eccentrically swivellably mounted relative to the eccentric shaft, and a driving bushing rotatably mounted about the rotation axis relative to the eccentric shaft and coupled in a geared manner to the clamping lever, wherein furthermore the clamping lever arrangement can be moved between a release position, a readiness position and a locking position, wherein the clamping lever in the release position releases the clamping pin and wherein the clamping lever in the locking position engages the clamping pin in an interlocking positive manner on account of a relative rotation of the eccentric shaft and driving bushing as well as clamping lever.

The device according to the invention includes a clamping lever, which can be swivellably as well as translationally displaced by the driving bushing and the eccentric shaft. In this way the clamping lever can be brought from the release position, in which the two structural parts to be joined can be detached from one another, via the readiness position, in which the two structural parts to be joined are positioned relative to one another, into the locking position, in which the two structural parts to be joined are firmly locked to one another. The locking preferably takes place by creating a state of tension, so that the two structural parts to be joined to one another are braced against one another and are thereby securely held on one another also in the event of vibrations. The tension forces occurring in this connection are generated by changing the clamping lever arrangement from the readiness position to the locking position, and are chosen so as to counteract any unintended loosening due to vibrations that occur. In addition to this, the interlocking positive engagement of the clamping lever on the clamping pin increases the operational reliability of the device according to the invention and reduces still further the risk of an unintended loosening of the device according to the invention.

According to the invention it may be envisaged that the driving bushing is swivellably mounted on the eccentric shaft. It may also be envisaged that the clamping lever is eccentrically swivellably mounted relative to the rotation axis on an eccentric section of the eccentric shaft. Moreover, in the invention it can be envisaged that the clamping lever comprises a bearing section receiving the eccentric shaft, and a claw or driver section that can be brought into interlocking engagement with the clamping pin. According to the invention the clamping lever can thus be displaced by rotating the eccentric shaft. On account of the arrangement of the clamping lever on the eccentric section of the eccentric shaft, the clamping lever swivels about a pivot axis defined by the eccentric section, which differs however from the rotation axis of the eccentric shaft.

A modification of the invention envisages that the bearing section has a stop means which, together with a counter-stop provided on the first structural part, defines the release position of the clamping lever arrangement. The provision of a stop means as well as a counterstop provides an unambiguous definition of the release position of the clamping lever arrangement. According to a modification of the invention the clamping lever arrangement can be tensioned in a spring-like manner in the direction of this release position.

As regards the structural configuration of the claw section, a modification of the invention envisages that this comprises a bearing surface, which in the readiness position rests on the clamping pin before reaching the locking position. The readiness position is thereby also predefined. In this connection it should be noted that the bearing surface of the claw section and further functional surfaces of the claw section, which will subsequently produce an interlocking positive connection of the clamping lever and clamping pin, are according to the invention configured in such a way that tightening bevelled sections are formed, which bring the clamping lever and the clamping pin into defined relative positions with respect to one another when the clamping lever arrangement moves from the readiness position to the locking position.

As already mentioned in the introduction, it is according to the invention desirable to join under a pretensioning the two structural parts to be connected to one another. In order to be able to apply these pretensioning forces advantageously and in a structurally simple manner, a modification of the invention envisages that the bearing section and the claw section are connected to one another via an elastically spring-acting connecting arm. The connecting arm is in this variant elastically deformed during the transformation from the readiness position to the locking position, and thus clamps together the two structural parts to be locked. In order to achieve this, the elastically spring-acting connecting arm can on the one hand be formed of an elastically deformable material. On the other hand, a suitably spring-acting behaviour can additionally or alternatively be achieved by shaping, for example in the manner of a curved clamping hoop.

Accordingly, on the movement of the clamping lever arrangement from the readiness position to the locking position the claw section engages on the clamping pin and, under elastic deformation of the connecting arm, clamps the first structural part to the second structural part.

With regard to the coupling of the driving bushing and clamping lever, a modification of the invention envisages that the clamping lever comprises a drive groove provided in the bearing section. In this connection it may furthermore be envisaged that the driving bushing comprises a drive lug which engages in the drive groove for the geared coupling of the driving bushing with the clamping lever. In this connection it should be said that the driving bushing, which is swivellably mounted on the eccentric shaft, and the clamping lever, which is likewise swivellably mounted on the eccentric shaft, rotate about different rotation axes during a relative rotation relative to the eccentric shaft.

On account of the fact that the clamping lever is mounted on the eccentric section of the eccentric shaft, this rotation axis about the eccentric shaft differs by the degree of eccentricity of the eccentric section relative to the rotation axis of the eccentric shaft. For this reason it is necessary, in the case of a coupling of the clamping lever and the driving bushing, to take account of the translational relative movements occurring between these two components due to the axial off-set in the case of a relative rotation with respect to the eccentric shaft. According to the invention it is therefore envisaged that the drive lug also moves in a translational manner within the drive groove in the event of a joint relative rotation of the clamping lever and driving bushing relative to the eccentric shaft. In order that this translational movement occurs in a low-friction and blockade-free manner as possible, a modification of the invention envisages that the drive lug has rounded side slopes. The rounded side slopes of the drive lug slide in a low-friction manner on the side slopes of the drive groove in the case of a translational movement of the drive lug and drive groove caused by the eccentricity described above.

In order to restrict the relative horizontal swing of the eccentric shaft on the one hand and the jointly moving components, i.e. the driving bushing and clamping lever on the other hand, it can according to the invention furthermore be envisaged that the drive lug comprises a stop surface situated radially inwardly with respect to the rotation axis, which in the locking position engages in a blocking manner with the eccentric section. In this connection a modification of the invention envisages that the stop surface is configured in such a way that in the movement of the clamping lever arrangement from the readiness position to the locking position the eccentric section of the eccentric shaft can move beyond an eccentric dead point about a locking angle relative to the driving bushing, before the stop surface abuts the eccentric sections.

Thus, it is possible to let the horizontal swing of the clamping lever in the movement of the clamping lever arrangement from the readiness position to the locking position to be sufficiently wide so that the clamping lever is first of all firmly clamped on account of the displacement of the eccentric section, until the eccentric section in its rotation reaches the dead point. When the dead point is reached the clamping lever exhibits its greatest elastic deformation. The eccentric shaft is then swivelled further however, so that the clamping lever tension is reduced slightly, but is held at a predetermined level. Finally, the stop surface of the driving bushing rests against the eccentric section, so that a further relative rotation from the eccentric section to the clamping lever until the state of unimpeded rotation is achieved is no longer possible. An opposite rotation of the eccentric shaft is however necessary only under a certain expenditure of force, since in this case the clamping lever would have to be more strongly elastically deformed again until the eccentric dead point position is reached. An unintended loosening, for example due to vibrations occurring during operation, is thus prevented. In the case of an intentional loosening the eccentric shaft first of all has to be moved against this counter-force just beyond this eccentric dead point. If the eccentric dead point is then exceeded, the remaining path will be traversed during the movement from the locking position to the readiness position, under a force-type support due to a release of tension of the clamping lever.

In order to increase the ergonomic efficiency, it is envisaged according to the invention to provide position markings on the eccentric shaft and on the driving bushing on a visible surface available during operation of the device, with the aid of which the position of the clamping lever arrangement can be read in one of the positions "release position", "locking position" or "readiness position". An operator then knows exactly in which position the device according to the invention is at any time.

From the structural point of view it may furthermore be envisaged that in order to actuate the eccentric shaft and driving bushing, engagement profiled sections, in particular hexagonal profiled sections, may be provided in all cases on the latter. Thus, for example, an external hexagonal profiled section can be arranged on the driving bushing, and a corresponding internal hexagonal profile section can be arranged on the eccentric shaft. These can then be appropriately engaged and rotatably actuated via an appropriate combination tool. Alternatively however, in order to increase the economic efficiency it is furthermore possible according to the invention to provide an actuating lever on both the eccentric shaft and driving bushing in order to actuate the latter.

The invention furthermore relates to a method for the detachable connection of structural parts in an aircraft using a device of the type described hereinbefore, in which the process comprises the following steps:

positioning the two structural parts to be joined together in a desired alignment with respect to one another, the clamping lever arrangement being in its released position, swivelling the driving bushing to swivel the clamping lever, so that the clamping lever arrangement moves from its release position to its readiness position, and swivelling the eccentric shaft to displace the clamping lever by swivelling the eccentric section, so that the clamping lever arrangement moves from its readiness position to its locking position.

According to the invention it is furthermore envisaged that the aforedescribed process steps are executed in the reverse order so as to detach the structural parts from one another by moving the clamping lever arrangement from its locking position via its readiness position to its release position.

A modification of the invention envisages that the swivelling of the driving bushing and the swivelling of the eccentric shaft when connecting as well as when detaching the structural parts take place in each case in the same direction of rotation.

BRIEF DESCRIPTION OF THE FIGURES

The invention is described in more detail hereinafter with the aid of the accompanying figures, in which:

FIG. 6 is a sectional representation through two structural parts to be joined, which illustrates the release position;

FIG. 7 is a representation according to FIG. 6, which illustrates the readiness position;

FIG. 8 is a representation according to FIGS. 6 and 7, which illustrates the locking position;

DETAILED DESCRIPTION OF THE FIGURES

Figure 1:
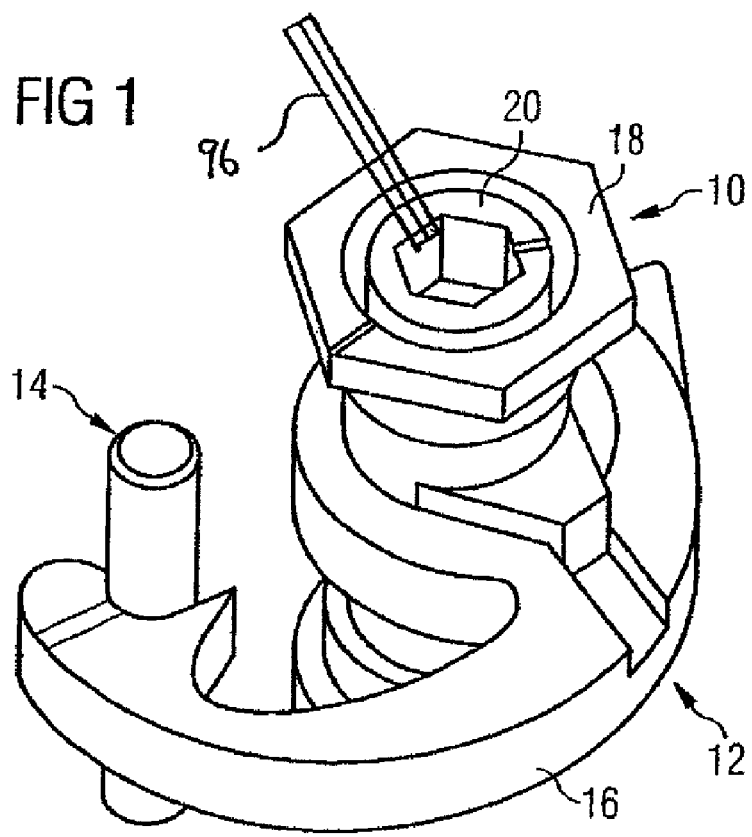
FIG. 1 is a perspective representation of the device according to the invention, the structural parts to be connected having been omitted.

In FIG. 1 a device according to the invention for connecting two structural parts, for example two structural elements in an aircraft, are shown separately and are generally identified by the reference numeral 10. The structure of the device according to the invention is described hereinafter with reference to FIGS. 1 to 5. The device 10 according to the invention includes a clamping lever arrangement 12, which is arranged on one of the structural parts to be connected, as well as a clamping pin 14, which is arranged on the other structural part. The clamping lever arrangement 12 includes a clamping lever 16, a driving bushing 18 and an eccentric shaft 20, which are mounted in the manner shown in FIG. 1.

Figure 2:
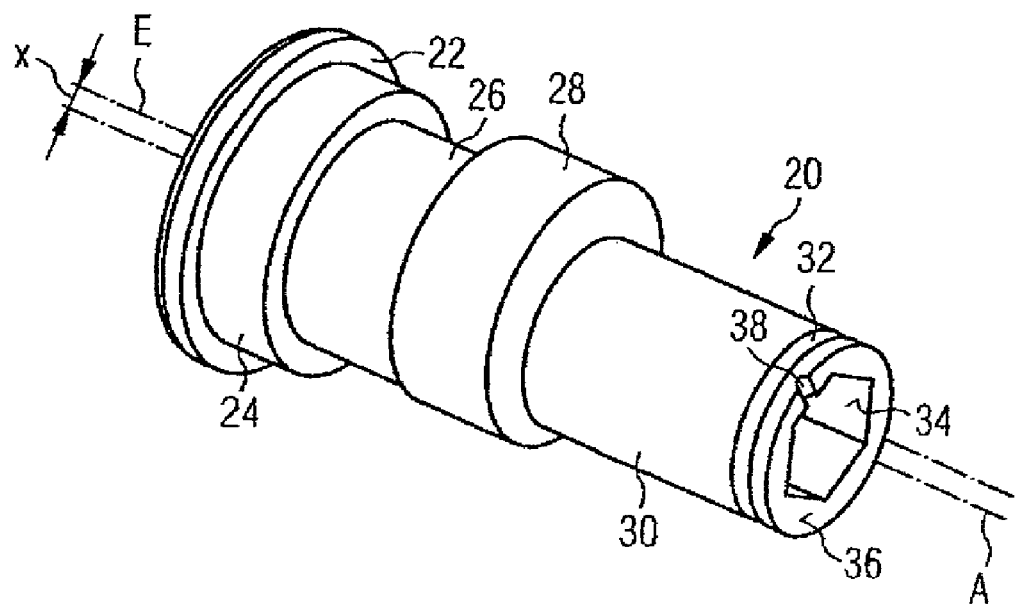
FIG. 2 is a perspective representation of the eccentric shaft according to the invention.

The eccentric shaft 20 is shown in a perspective view as a single part in FIG. 2. A bearing section 24, by means of which the eccentric shaft 20 is rotatably accommodated in the first of the structural parts to be connected, extends from a flange 22. To this end this first structural part to be connected comprises a corresponding receiving opening, which is also described hereinafter with reference to FIG. 13.

A shank section 26 adjoins the bearing section 24. An eccentric section 28 adjoins the shank section 26 in the direction of the longitudinal axis A. Starting from the eccentric section 28, a bearing shank 30 of smaller diameter compared to the shank section 26 extends in the axial direction. This bearing shank has at its right-hand end in FIG. 2 a circumferential recess 32 for receiving a locking ring. The bearing shank 30 is provided on its right-hand front surface 36 in FIG. 2 with an internal hexagonal opening 34, which can receive a corresponding external hexagonal tool. In addition the eccentric shaft 20 has on its front surface 36 a notch marking 38, the purpose of which will be discussed in more detail hereinafter.

From FIG. 2 it is clear that the flange 22, the bearing section 24, the shank section 26 as well as the bearing shank 30 are arranged concentrically, the longitudinal axis A passing through their centre. The eccentric section 28 is on the other hand arranged eccentrically, its eccentric longitudinal axis E extending parallel to the longitudinal axis A of the eccentric shaft 20, but offset by an amount X. This is illustrated simply diagrammatically in FIG. 2.

Figure 3:
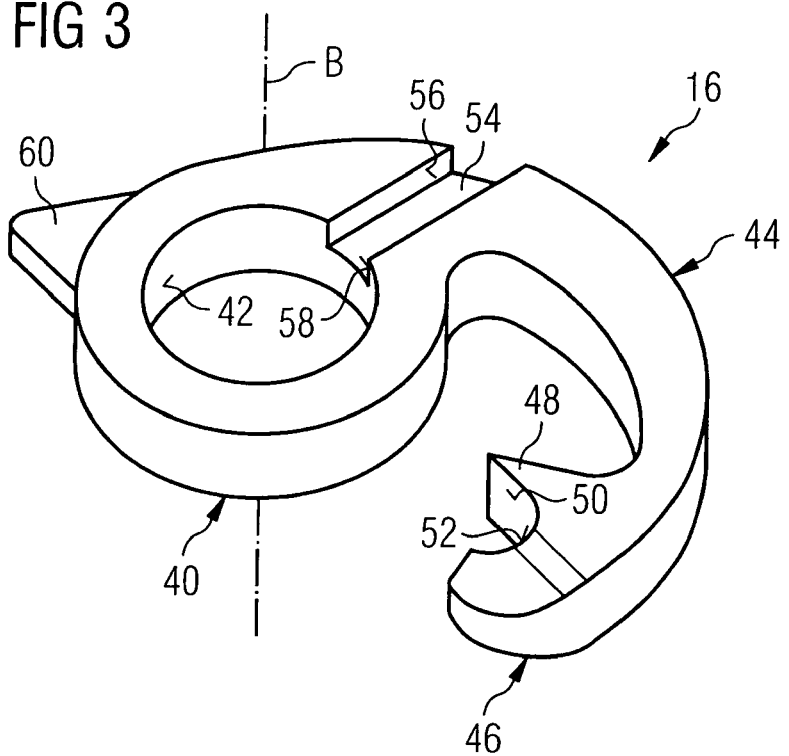
FIG. 3 is a perspective representation of the clamping lever according to the invention.

FIG. 3 shows the clamping lever 16 in a perspective individual representation. The clamping lever 16 comprises a bearing section 40, which surrounds a circular cylindrical bearing opening 42. The internal diameter of the circular cylindrical bearing opening 42 matches the external diameter of the eccentric section 28 of the eccentric shaft 20, so that the clamping lever 16 can accommodate the eccentric section 28 free from play but in a rotationally movable manner in its bearing opening 42.

An arch-shaped connecting arm 44 adjoins the bearing section 40, the arm running tangentially from the bearing section 40 and tapering towards its free end. A claw section 46, into which the connecting arm 44 transforms smoothly, is formed at the end of the connecting arm 44. This claw section has a stop tooth 48, which is provided with a bearing surface 50. A receiving cavity 52, which as shown in FIG. 1 can surround the clamping pin 14 in an interlocking positive manner, progresses in a steady transition from the bearing surface 50.

In addition the clamping lever 16 comprises a driving groove 54, which is bounded by lateral slopes 56 and 58. Finally, it can also be seen in FIG. 3 that a stop lug 60 is formed on the bearing section 40, which lug—as will be discussed in more detail hereinafter—is effective in defining the release position.

In FIG. 3 there can also be seen the swivelling axis B of the swivelling lever 16, which in the mounted state coincides with the eccentric axis E of the eccentric shaft, as shown in FIG. 2.

Figure 4:
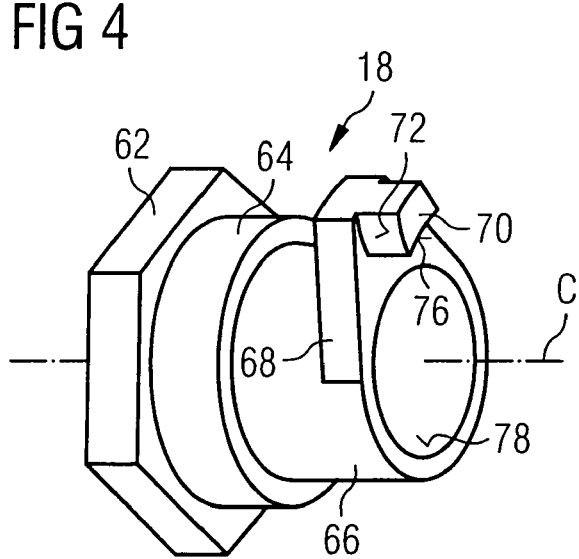
FIG. 4 is a perspective representation of the driving bushing according to the invention.
Figure 5:
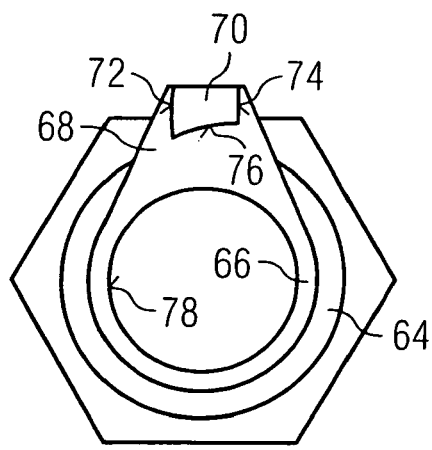
FIG. 5 is a side view from the left of the driving bushing shown in FIG. 4.

The driving bushing 18 is illustrated in FIGS. 4 and 5, FIG. 4 showing a perspective representation and FIG. 5 a side view from the left. Along a longitudinal axis C the driving bushing 18 is, as shown in FIG. 4, formed at its left-hand end in the figure first of all with an outer hexagonal profiled section 62 that receives a corresponding internal hexagonal tool or other suitable device/lever/tool as described and understood herein. This is adjoined by a bearing section 64, which serves for the bearing in a corresponding recess in the first structural part, and has roughly the same diameter as the bearing section 24 on the eccentric shaft 20. The bearing section 64 is adjoined by a shank section 66 of smaller diameter, on the free end of which is formed a bracket 68. The bracket 68 has conically running side surfaces and is provided on its free end with a drive lug 70, which projects in the direction of the longitudinal axis C. The drive lug 70 has rounded side slopes 72 and 74. In addition the drive lug has on its radially internally lying region a similarly rounded and asymmetrically running stop surface 76. The round contour of the stop surface 76 corresponds roughly to the round contour of the jacket surface of the eccentric section 28 of the eccentric shaft 20.

The driving bushing 18 is provided with a through hole 78, the internal diameter of which matches the external diameter of the bearing shank 30 of the eccentric shaft.

Figure 12:
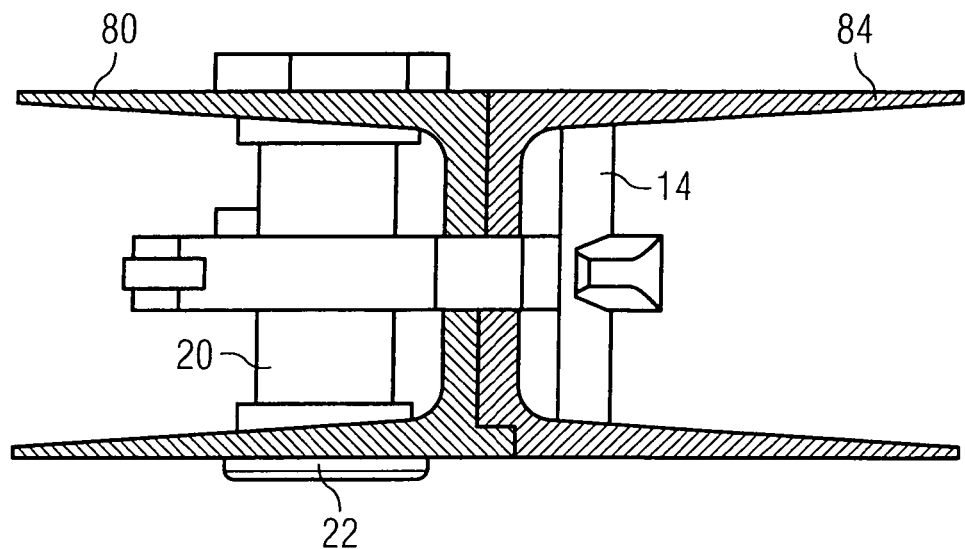
FIG. 12 is a sectional view along the sectional line XXII-XXII in FIG. 8.
Figure 13:
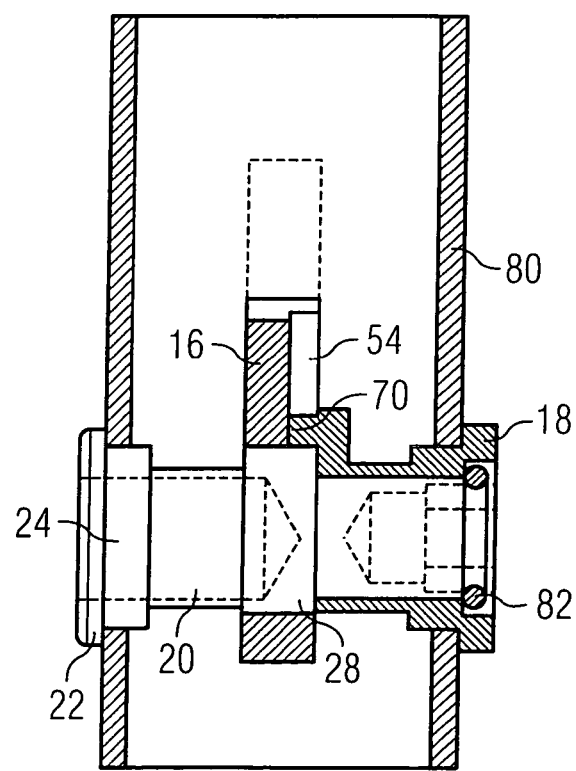
FIG. 13 is a sectional view along the sectional line XXIII-XXIII in FIG. 8.

With regard to the mounting of the lever arrangement according to the invention on a first structural part 80, reference is made to FIGS. 12 and 13. It can be seen that the clamping lever 16 is mounted on the eccentric section 28 of the eccentric shaft 20. The clamping lever is prevented, in a manner not shown, from sliding underneath the eccentric section. The eccentric shaft 20 is inserted into the first structural part 80 and lies, with its bearing section 24, in a corresponding opening of the first structural part 80. The eccentric shaft 20 lies with its flange 22 on the outside of the first structural part 80. The driving bushing 18 is mounted on the end of the eccentric shaft 20 remote from the flange and is held in place by means of a locking ring 82. At the same time the drive lug 70 engages in a geared manner in the drive groove 54, with the result that the clamping lever 16 on rotation of the driving bushing 18 is engaged by the drive lug 70. This can also be seen in FIG. 1. The clamping pin 14 is fixed in a second structural part 84, in which connection the second structural part 84 is to be detachably connected to the first structural part 80. For the preliminary positioning the two structural parts to be connected to one another can be aligned relative to one another by means of dowel pins.

For the mode of action of the clamping lever arrangement according to the invention, reference is made to FIGS. 6 to 11. FIG. 6 shows the release position. In this connection the clamping lever 16 is shown in the "swung-in" position. This means that the clamping lever 16 lies in the first structural part 80 and also does not project from an opening 86 of a side wall 88 of the first structural part. The position of the clamping lever 16 in the release position according to FIG. 6 is defined by the fact that the stop lug 16 abuts from the inside against the side wall 88, so that the clamping lever 16 cannot rotate further in an anti-clockwise direction about the rotation axis A of the eccentric shaft 20.

Figure 9:
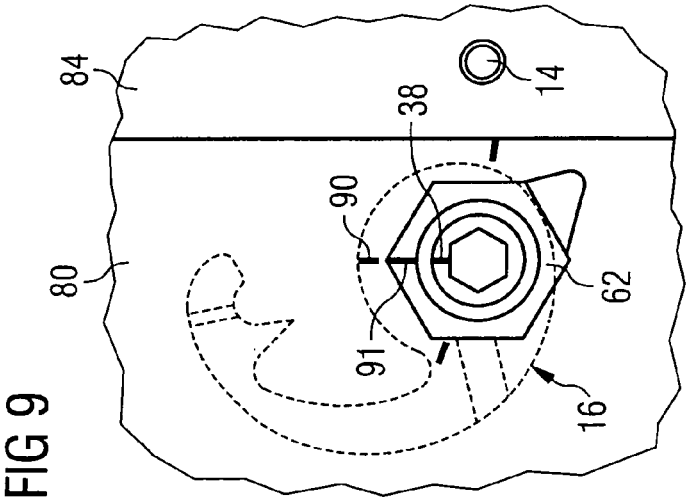

FIG. 9 corresponds to the release position, but in a non-sectional representation. It can be seen that the notch mark 38 and a further notch mark 91 on the front surface of the outer hexagonal profiled section 62 of the driving bushing 18 coincide with a position mark 90 firmly attached to the first structural part 80. In addition the contour of the clamping lever 16 can be recognised in FIG. 9 in the form of dotted lines.

Figure 10:
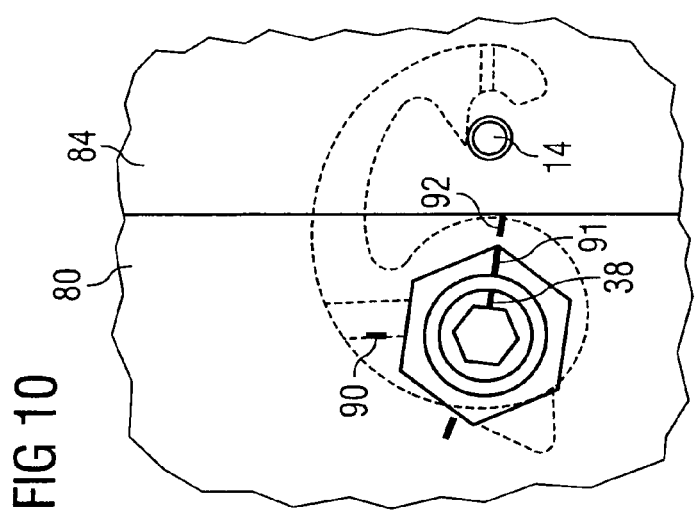

By rotating the driving bushing 18, in the transition from the state according to FIG. 6 and FIG. 9 to the state according to FIG. 7 or FIG. 10 showing the readiness position, the outer hexagonal profiled section 62 is engaged and this turns in a clockwise direction, as shown by the arrow P in FIG. 7. This rotational movement is executed until the bearing surface 50 engages with the clamping pin 14. In this rotational movement the driving bushing entrains the clamping lever 16 through the drive lug 70. Furthermore, the eccentric shaft 20 is correspondingly also entrained in this rotational movement. It can be seen that the claw section 46 can slide past the clamping pin 14 without any difficulty, until the position shown in FIG. 7 is reached. It can also be seen that the two marks 38 and 91 coincide with a further mark 92, which indicates that the readiness position has been reached.

In the readiness position according to FIGS. 7 and 10 the two structural parts 80 and 84 are not yet firmly connected to one another. This is achieved only by transferring the clamping lever arrangement from the readiness position to the locking position shown in FIGS. 8 and 11. At the same time the eccentric shaft 20 is rotated further in a clockwise direction by means of a hexagonal tool. The clamping lever 16 as well as the driving bushing 18 cannot follow this rotational movement, since the clamping pin 14 blocks this rotational movement. By rotating the eccentric shaft 20 the eccentric section 28 rotates with it. This rotation of the eccentric shaft means that the bearing section 40 of the clamping lever 16 is displaced translationally to the left according to the arrow Q in FIG. 8 in the context of a "wobbling" movement. In this way the receiving cavity 52 of the claw section 46 is first of all drawn in the direction of the clamping pin 14 until there is an interlocking positive engagement of the receiving cavity 52 and clamping pin 14.

The translational displacement of the bearing section 40 in FIG. 8 corresponding to the arrow Q to the left due to a rotation of the eccentric section 28 is sufficiently large so that the clamping lever 16 is "stretched". This leads to an elastic deformation of the connecting arm 44 and thus to a distortion of the two structural parts 80 and 84 with respect to one another, whereby manufacturing tolerances can also be compensated.

The rotation of the eccentric shaft 20 in the clockwise direction is however limited. In the relative rotation of the eccentric shaft 28 relative to the driving bushing 18, the eccentric section 28 abuts the stop section 76. On account of its asymmetrical arrangement this blocks a further relative rotation of the eccentric shaft 20, i.e. with this rotation of the eccentric section 28, relative to the driving bushing 18. In other words, the eccentric section 28 when it abuts its jacket surface can no longer be rotated relative to the driving bushing 18.

The geometry of the eccentric shaft 20 and of the driving bushing 18 is chosen so that the aforedescribed stop function of the eccentric section 28 and stop surface 76 only occurs when the relative rotation of the eccentric shaft 20 and driving bushing 18 has gone beyond an eccentric dead point, which in FIG. 8 lies in a horizontal plane containing the rotation axis A. The extent to which the rotation goes beyond the eccentric dead point is given by the angle α. This means that when this horizontal plane is reached, a maximum displacement of the bearing section in the direction of the arrow Q away from the clamping pin 14 exists. In other words, when the eccentric dead point is reached the clamping lever 16 is elastically deformed by the maximum amount. On passing through the angular region a in the course of a further rotation of the eccentric shaft 20, a partial release of tension of the lever 16 accordingly occurs. This ensures a firm locking of the clamping lever arrangement, which is safe against any self-release, since in the clockwise direction the blocking action of the stop surface 76 becomes active and prevents any further rotation. The clamping forces of the clamping lever 16 that have to be overcome in this connection block any unintended movement in the anti-clockwise direction.

Figure 11:
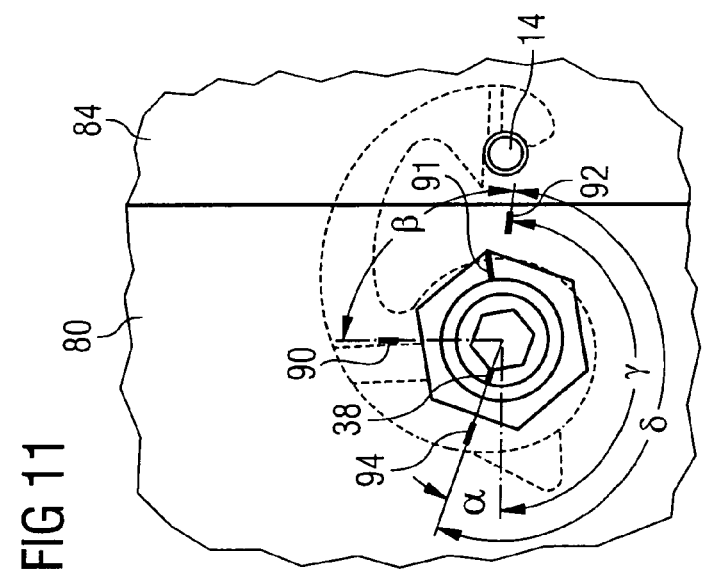
FIGS. 9 to 11 are side views of the structural parts to be connected, which correspond to the positions according to FIGS. 6 to 8.

In FIG. 11 it can be seen that the mark 38 is now flush with the mark 94, which shows that the hole clamping lever arrangement is in the locking position.

Further individual angles are shown in FIG. 11. The angle α is the angle of maximum swivelling movement of the eccentric shaft after the dead point has been passed. The angle β is the angle which is traversed on moving from the arrived-at position shown in FIG. 6 to the readiness position shown in FIG. 7. The angle γ is the angle between the readiness position and the eccentric dead point. The angle δ is the angle between the readiness position and the locking position.

In order to release the arrangement the eccentric shaft 20 is first of all turned back from the locking position shown in FIGS. 8 and 11. The two components are then moved in an anti-clockwise direction and brought into the initial position shown in FIGS. 6 and 9.

By means of the invention a connection of two structural parts that are to be joined to one another and that is secure against vibrations and other external influences can be achieved in a simple manner. This connection is characterised in particular by the fact that it employs no loose parts, which might be lost. It is furthermore characterised by the fact that it is very reliable through achieving a preliminary clamping state by elastic deformation of the clamping lever 16, and compensates manufacturing tolerances.

The invention claimed is:
1. Device (10) for the detachable connection of structural parts (80, 84), in particular in an aircraft, comprising a clamping lever arrangement (12) associated with a first structural part (80) and a clamping pin (14) associated with a second structural part (84), wherein the clamping lever arrangement

(12) comprises an eccentric shaft (20) rotatably mounted about a rotation axis (A) on the first structural part (80), a clamping lever (16) mounted eccentrically and swivellably with respect to the eccentric shaft (20), and a driving bushing (18) rotatably mounted relative to the eccentric shaft (20) about the rotation axis (A) and coupled in a geared manner to the clamping lever (16), wherein the clamping lever arrangement (12) is rotated from a release position, wherein the clamping lever (16) is not engaged to the clamping pin (14), to a readiness position, wherein the clamping lever contacts the clamping pin in a non-locked position, by means of a first actuator actuating on the driving bushing; and wherein further movement of the clamping lever arrangement (12) will allow an eccentric section (28) of the eccentric shaft (20) to abut a surface of a stop section (76) of the driving bushing (18), making the clamping lever (16) to slidably move, allowing the clamping pin (14) to be received in a cavity (52) of the clamping lever (16) to lock the clamping lever arrangement, by means of a second actuator actuating on the eccentric shaft.

2. Device (10) according to claim 1, wherein the driving bushing (18) is swivellably mounted on the eccentric shaft (20).

3. Device (10) according to claim 1, wherein the clamping lever (16) is eccentrically swivellably mounted relative to the rotation axis (A) on an eccentric section (28) of the eccentric shaft (20).

4. Device (10) according to claim 3, wherein the clamping lever (16) comprises a bearing section (40) accommodating the eccentric shaft (20) and a claw section (46) that can be brought into interlocking positive engagement with the clamping pin (14).

5. Device (10) according to claim 4, wherein the bearing section (40) has a stop means (60), which together with a counter-stop provided on the first structural part (80) defines the release position of the clamping lever arrangement (12).

6. Device (10) according to claim 4, wherein the claw section (46) has a bearing surface (50), which in the readiness position abuts the clamping pin (14) before the locking position is reached.

7. Device (10) according to claim 4, wherein the bearing section (40) and the claw section (46) are connected to one another via an elastically deformable connecting arm (44).

8. Device (10) according to claim 4, wherein in the movement of the clamping lever arrangement from the readiness position to the locking position the claw section (46) engages on the clamping pin (14), and under elastic deformation of the connecting arm (44) clamps the first structural part (80) to the second structural part (84).

9. Device (10) according to claim 4, wherein the clamping lever (16) has a drive groove (54) provided in the bearing section (40).

10. Device (10) according to claim 1, wherein the driving bushing (18) has a drive lug (70), which engages in the drive groove (54) for the geared coupling of the driving bushing (18) with the clamping lever (16).

11. Device (10) according to claim 10, wherein the drive lug (70) has rounded side slopes (72, 74).

12. Device (10) according to claim 10, wherein the drive lug (70) has a stop surface (76) lying radially inwardly relative to the rotation axis (C) of the driving bushing (18), the stop surface coming in to blocking engagement with the eccentric section (28) in the locking position.

13. Device (10) according to claim 12, wherein the stop surface (76) is designed so that in the movement of the clamping lever arrangement (12) from the readiness position to the locking position the eccentric section (28) of the eccentric shaft (20) can be displaced relative to the driving bushing (18) by a locking angle ($\alpha$) beyond an eccentric dead point, before the stop surface (76) abuts the eccentric section (28).

14. Device (10) according to claim 1, wherein position marks (38, 91) are provided on the eccentric shaft (20) and on the driving bushing (18) on a visible surface available during operation of the device, with the aid of which marks the positioning of the clamping lever arrangement (12) can be read in one of the positions "release position", "locking position" or "readiness position".

15. Device (10) according to claim 1, wherein in order to actuate the eccentric shaft (20) and driving bushing (18), by means of an actuating tool, engagement profiled sections, in particular hexagonal profiled sections, are provided on them.

16. Method for the detachable connection of structural parts, in particular in an aircraft, using a device (10) according to claim 1, comprising the following steps:
positioning the two structural parts to be joined together in a desired alignment with respect to one another, the clamping lever arrangement being in its released position,
swivelling the driving bushing to swivel the clamping lever, so that the clamping lever arrangement moves from its release position to its readiness position, and
swivelling the eccentric shaft (20) to displace the clamping lever by swivelling the eccentric section, so that the clamping lever arrangement moves from its readiness position to its locking position.

17. Method according to claim 16, wherein in order to release the structural parts from one another by moving the clamping lever arrangement from its locking position via its readiness position to its release position, the steps according to claim 16 are carried out in the reverse order.

18. Method according to claim 16, wherein the swivelling of the driving bushing and the swivelling of the eccentric shaft (20) when connecting as well as when detaching the structural parts takes place in each case in the same rotational direction.

\* \* \* \* \*